US012601686B2

(12) United States Patent
Benedict et al.

(10) Patent No.: US 12,601,686 B2
(45) Date of Patent: Apr. 14, 2026

(54) METHOD OF RAMAN SPECTROSPY FOR DETERMING CONCENTRATION OF A TARGET COMPONENT OF A MEDIUM INCLUDING MULTIPLE COMPONENTS

(71) Applicant: Endress+Hauser Optical Analysis, Inc., Ann Arbor, MI (US)

(72) Inventors: Randy Benedict, Ann Arbor, MI (US); Joel Patrow, Ann Arbor, MI (US); Patrick Ehlers, Mölnycke (SE)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 77 days.

(21) Appl. No.: 18/533,468

(22) Filed: Dec. 8, 2023

(65) Prior Publication Data

US 2025/0189452 A1      Jun. 12, 2025

(51) Int. Cl.
G01N 21/65          (2006.01)

(52) U.S. Cl.
CPC .................................... G01N 21/65 (2013.01)

(58) Field of Classification Search
CPC ...................................................... G01N 21/65
See application file for complete search history.

(56) References Cited

U.S. PATENT DOCUMENTS

2011/0087439 A1* 4/2011 Ziegler .................. G01N 21/65
                                                          702/19
2012/0089344 A1* 4/2012 Wright ................ H01J 49/0036
                                                           703/2

(Continued)

FOREIGN PATENT DOCUMENTS

CN        105466908 A  *  4/2016  ............. G01N 21/65
CN        112304918 A  *  2/2021  ............. G01N 21/65

(Continued)

OTHER PUBLICATIONS

Coca, N., Data Science for Raman Spectroscopy: A Practical Example A practical example on spectra pre-processing and modeling, Jan. 16, 2023 (Year: 2023).*

(Continued)

*Primary Examiner* — Kara E. Geisel
*Assistant Examiner* — Roberto Fabian, Jr.
(74) *Attorney, Agent, or Firm* — Gil M. Repa; Endress+Hauser (USA) Holding, Inc.

(57)          ABSTRACT

A method of Raman spectroscopy for determining concentrations of at least one target component included in a medium including a given combination of multiple components includes: for each component of the medium, providing a reference spectrum of the component; based on Raman peaks included in the reference spectra, identifying Raman peaks that occur within less than a predetermined minimum spectral distance from each other as disturbing peaks; for each component, determining a component spectrum by eliminating each Raman peak included in the reference spectrum of the respective component identified as a disturbing peak; based on the component spectra, determining synthetic spectra of samples of the medium including different concentrations of the components; and based on the synthetic spectra, determining and providing a model for determining concentrations of each target component based on measured spectra of samples of the medium.

17 Claims, 4 Drawing Sheets

(56) References Cited

U.S. PATENT DOCUMENTS

2022/0091026 A1*  3/2022  Scott ..................... G01P 13/045
2022/0205840 A1*  6/2022  Gaume ................. G01J 3/0297

FOREIGN PATENT DOCUMENTS

DE        69027233 T2    10/1996
WO        2020053089 A1    3/2020
WO        2023058052 A1    4/2023

OTHER PUBLICATIONS

Coca, N., A Classical Least Squares Method for Quantitative Spectral Analysis with Python, Apr. 13, 2020 (Year: 2020).*
7. Chen, Hui, et al. "Eliminating non-linear raman shift displacement between spectrometers via moving window fast fourier transform cross-correlation." Frontiers in Chemistry 6 (2018): 515, teaches eliminating a non-linear Raman shift displacement method using cross-correlation techniques (Year: 2018).*
8. Schulze, H. Georg, et al. "Critical evaluation of spectral resolution enhancement methods for Raman hyperspectra." Applied spectroscopy 76.1 (2022): 61-80, teaches a method for enhancing Raman spectra (Year: 2022).*

* cited by examiner

METHOD OF RAMAN SPECTROSPY FOR DETERMING CONCENTRATION OF A TARGET COMPONENT OF A MEDIUM INCLUDING MULTIPLE COMPONENTS

TECHNICAL FIELD

The present disclosure relates to a method of Raman spectroscopy for determining concentrations of at least one target component included in a medium in at least one application, wherein the medium includes a given combination of multiple components and each target component is one of the multiple components.

BACKGROUND

Raman spectrometers are currently employed in a large variety of different applications including industrial applications, as well as laboratory applications to determine concentrations of components included in a medium.

Raman spectrometers commonly include a light source transmitting monochromatic excitation light to a sample of the medium and a spectrometric unit receiving Raman scattered light emanating from the illuminated sample and determining and providing measured spectra of the medium corresponding to intensity spectra of the received Raman scattered light. The measured spectra are, e.g., provided to an evaluation unit determining and providing concentrations of at least one target component included in the medium based on a previously determined model for determining these concentrations based on spectral intensities of the measured spectra at selected spectral lines.

Models used in Raman spectroscopy to determine concentrations of target components included in a medium are, e.g., determined based on experimentally determined reference sample spectra of reference samples exhibiting known or measured values of the concentrations of the components and a detailed analysis of the reference sample spectra.

There are a large number of applications in which the medium includes multiple components. These applications, e.g., include applications in the petrochemical industry in gas production, treatment and/or processing plants, as well as applications in which the measurements are performed in storage facilities, in supply units and/or in terminals. As an example, Raman spectrometers are, e.g., employed in hydrogen, methanol and/or ammonia production plants in steam methane reformers, in partial oxidation reformers, in coal gasifiers, in petcoke gasifiers, in biomass gasifiers and in waste gasifiers, as well as in liquid natural gas (LNG) production, processing, refrigeration and/or storage facilities to determine concentrations of components of media including multiple components.

In many of these applications, concentration measurements performed with Raman spectrometers are, e.g., employed to monitor, to regulate and/or to control operation of a plant or facility and/or to monitor, to regulate and/or to control a process performed at the respective application. Correspondingly, there is a need to determine the concentrations of the components with high accuracy.

As an approximation, Raman spectra of media including multiple components may be assumed to correspond to a superposition of Raman scattered light emanating from each of the components. This superposition has to be properly accounted for in models for determining concentrations of individual components of media including multiple components. As a result, a model for determining concentrations of a target component, which has been determined based on reference sample spectra of reference samples including an application-specific combination of components, will in most cases be unsuitable for determining concentrations of the same target component in another application, in which the medium includes a different combination of components. Due to the multitude of different application-specific combinations of components, this requires for a corresponding multitude of different models to be determined.

The determination of each model requires a sufficiently large number of reference sample spectra of reference samples covering a sufficiently wide range of concentrations of each component. Experimentally determining large numbers of reference sample spectra together with the concentrations of the components included in each reference sample is, however, a tedious and time consuming process and the number of reference sample spectra needed increases with the number of components included in the medium. On the other hand, determining models based on an insufficient number of reference sample spectra will in most cases reduce the measurement accuracy of concentration measurements performed with these models. In addition, reference samples exhibiting very high concentrations of individual components, as well as reference samples exhibiting very low concentrations of individual components, may not always be easily available. The latter may lead to a limitation of the measurement ranges, in which the models are capable of providing accurate concentration measurement results, to the limited concentration ranges covered by the reference samples.

Another challenge is that the determination of models for determining concentrations of target components of media including multiple components constitutes a demanding task. One of the reasons for this is that measured spectra of media including multiple components correspond to a superposition of the contributions of all components included in a medium. As a result, in the measured spectra information on the concentration of a specific target component may be obscured by contributions of other components to the spectral intensities of the measured spectra in multiple spectral regions. The adverse effect of obscured information on concentration measurements is especially large in applications in which the contributions of the individual components are correlated and/or occur in at least partially overlapping spectral regions. This is, e.g., the case in applications in which the components of the medium exhibit at least partially overlapping Raman bands. In these applications, at least some of the Raman peaks associated to a given target component may occur in spectral regions that at least partially overlap with spectral regions where the other components exhibit Raman peaks.

This makes very difficult quantitatively assessing interdependencies between the spectral intensities of the measured spectra and the concentrations of the individual components and properly determining the spectral lines at which the spectral intensities of the measured spectra reliably provide information that enables for the concentrations of individual target components to be accurately determined.

At the same time, the measurement accuracy achievable with models for determining concentrations of target components depends on the quantitative assessment of the interdependencies, as well as on the determination of spectral lines at which the measured spectra provide the desired information.

In these respects, model determination becomes increasingly more difficult with an increasing number of components, with an increasing degree of correlation between the contributions of the individual components to the spectral intensities of the measured spectra, and with an increasing number of at least partially overlapping Raman bands exhibited by the individual components.

Accordingly, there remains a need for further contributions in this area of technology. As an example, there is a need for a method of Raman spectroscopy enabling a more efficient determination of training data for determining models for determining concentrations of target components of media including multiple components. In this respect, there is a need for an efficient method of determining and providing training data covering a broad range of concentration values of the individual components.

As another example, there is a need for a method of Raman spectroscopy that enables a more efficient determination of the models and/or that enables for the models to be determined such that a high measurement accuracy of the concentrations measurements is achievable with the models. In this respect, there is a need for an efficient method of determining and providing training data, which method reduces the adverse effects of obscured information on model determination, makes easier the determining of the spectral lines at which spectral intensities of measured spectra of the medium reliably provide information enabling accurate determinations of concentrations of target components, and/or can be determined in an at least partially automated manner.

SUMMARY

The present disclosure includes a method of Raman spectroscopy for determining concentrations of at least one target component included in a medium in at least one application, wherein the medium includes a given combination of multiple components and each target component is given by one of the multiple components, the method comprising:

for each component of the medium, providing a reference spectrum of the component;

based on Raman peaks included in the reference spectra of all components, identifying Raman peaks that occur within less than a predetermined minimum spectral distance from each other as disturbing peaks;

for each component, based on the reference spectrum of the respective component, determining a component spectrum by eliminating each Raman peak included in the reference spectrum of the respective component that has been identified as a disturbing peak;

based on the component spectra, determining synthetic spectra of samples of the medium including different concentrations of each of the components; and based on the synthetic spectra, determining and providing a model for determining concentrations of each target component based on measured spectra of samples of the medium.

The method of the present disclosure provides the advantage of reducing the time and effort involved in determining and providing training data for determining the model, of reducing the time and effort involved in determining the model, and of achieving a high measurement accuracy of concentrations measurements performed with the model provided by the method.

In this respect, the component spectra provide the advantage that large numbers of synthetic spectra of samples covering broad ranges of the concentrations of each of the components can be very easily determined based on the component spectra in a very efficient manner and/or in an automated manner.

At the same time, determining the component spectra by eliminating the disturbing peaks provides the advantage of significantly reducing the spectral overlap and/or the correlation between the contributions of the component spectra to the synthetic spectra.

Correspondingly, determining the model based on synthetic spectra that have been determined based on these component spectra significantly reduces the adverse effects of obscured information on the model determination. In this respect, the synthetic spectra facilitate quantitatively assessing and accounting for interdependencies between the spectral intensities of the measured spectra and the concentrations of the individual components, as well as determining the spectral lines at which the spectral intensities of the measured spectra reliably provide information enabling for the concentrations of individual target components to be accurately determined. This reduces the time and effort involved in determining the model and increases the measurement accuracy achievable with the thus determined model.

In certain embodiments, the method further comprises with a Raman spectrometer configured to determine the measured spectra of samples of the medium and, based on the measured spectra and the previously determined model, to determine and provide the measurement results of the concentrations of each target component included in the samples of the medium.

In at least one embodiment, the minimum spectral distance is predetermined such that Raman peaks that are spaced apart by more than the minimum spectral distance are identifiable as distinguishable peaks in a sum spectrum given by the sum of the intensity spectra of the respective Raman peaks, and/or such that Raman peaks that are spaced apart by less than the minimum spectral distance are indistinguishable in a sum spectrum given by the sum of the intensity spectra of the respective Raman peaks.

In certain embodiments, identifying the disturbing peaks comprises determining all possible pairs of Raman peaks determinable based on the Raman peaks included in all reference spectra and, for each pair, determining the spectral distance between the Raman peaks of the respective pair and identifying both peaks of the respective pair as disturbing peaks when the spectral distance between them is smaller than the minimum spectral distance.

In further embodiments, for each component, the determining of the component spectrum of the respective component further includes at least one of:

limiting a spectral width of each Raman peak remaining in the component spectrum after the eliminating of the disturbing peak(s); and truncating peak tails from both sides of each Raman peak remaining in the component spectrum after the eliminating of the disturbing peak(s).

In certain embodiments, for each component, the determining of the component spectrum of the respective component further includes setting a spectral intensity of each Raman peak remaining in the respective component spectrum to a baseline value or to a base line value of zero in spectral regions covered by the corresponding Raman peak in the reference spectrum that are spaced apart from a peak position of the respective Raman peak at which the Raman peak exhibits its center or maximum by more than a predetermined spectral distance.

As an example, in certain embodiments, for each component, the determining of the component spectrum of the respective component further includes limiting a spectral width of each Raman peak remaining in the component spectrum after eliminating the disturbing peak(s), wherein limiting the spectral width is performed:

a) by performing a width limitation method accounting for a spectral shape exhibited by the respective Raman peak in the reference spectrum of the respective component;

b) based on an intensity spectrum exhibited by the respective Raman peak in the reference spectrum of the respective component;

c) based on a first derivative, a second derivative, and/or a higher order derivative of an intensity spectrum exhibited by the respective Raman peak in the reference spectrum of the respective component; and/or d) based on features exhibited by a first derivative, a second derivative, and/or a higher order derivative of the intensity spectrum exhibited by the respective Raman peak in the reference spectrum of the respective component at spectral lines on both sides of a peak position of the respective Raman peak in the reference spectrum.

According to an embodiment, for each component, the determining of the component spectrum of the respective component further includes, for each Raman peak remaining in the component spectrum:

determining a first derivative of an intensity spectrum exhibited by the corresponding Raman peak in the reference spectrum of the respective component;

setting a spectral intensity of the respective remaining Raman peak to a baseline value or to a baseline value of zero in a first spectral region covered by the corresponding Raman peak in the reference spectrum, wherein the first spectral region includes spectral lines less than a spectral line at which the first derivative exhibits a maximum by more than a predetermined spectral distance; and setting a spectral intensity of the respective remaining Raman peak to a baseline value or to a baseline value of zero in a second spectral region covered by the corresponding Raman peak in the reference spectrum, wherein the second spectral region includes spectral lines greater than a spectral line at which the first derivative exhibits a minimum by more than the predetermined spectral distance.

According to a further embodiment, for each component, the determining of the component spectrum of the respective component further includes for each Raman peak remaining in the component spectrum performing the method steps of:

determining a second derivative of an intensity spectrum exhibited by the respective Raman peak in the reference spectrum of the respective component;

based on the second derivative exhibiting two peaks and a valley located between the two peaks performing a method step of determining the peak positions of the two peaks;

setting a spectral intensity of the respective remaining Raman peak to a baseline value or to a baseline value of zero in a first spectral region covered by the corresponding Raman peak in the reference spectrum, wherein the first spectral region includes spectral lines greater than the smaller one of the peak positions of the two peaks by more than a predetermined spectral distance; and setting a spectral intensity of the respective remaining Raman peak to a baseline value or to a baseline value of zero in a second spectral region covered by the corresponding Raman peak in the reference spectrum, wherein the second spectral region includes spectral lines exceeding the larger one of the peak positions of the two peaks by more than the predetermined spectral distance.

In certain embodiments, each synthetic spectrum is determined as a weighted sum of the component spectra of each of the components included in the medium, wherein each weighing factor corresponds to the concentration of the respective component included in the sample.

In further embodiments, determining the model comprises based on training data including the synthetic spectra of the samples and the concentrations of the components included in each sample performing at least one of:

based on an analysis or a multivariate analysis of the training data determining and providing an algorithm for calculating concentrations of each target component included in samples of the medium based on spectral intensity values of measured spectra of the samples of the medium;

quantitatively assessing interdependencies between spectral intensities of the synthetic spectra and the concentrations of the individual components and determining the model based on the quantitatively assessed interdependencies; and determining spectral lines, at which the spectral intensities of the synthetic spectra provide information enabling for the concentrations of the target component(s) to be determined and determining the model such, that it is configured to determine concentrations of each target component included in samples of the medium based on spectral intensity values of measured spectra of samples of the medium at selected spectral lines corresponding to spectral lines at which the spectral intensities of the synthetic spectra provide information enabling for the concentrations of the target component(s) to be determined.

The disclosure further includes embodiments, wherein for at least one or each component providing the reference spectrum of the respective component includes with a Raman spectrometric instrument determining and providing at least one intensity spectrum of a sample of the pure component, and determining and providing the respective reference spectrum based on the at least one intensity spectrum.

Certain embodiments of the method further comprise storing at least one or each reference spectrum that has been determined for one of the components in a database, and with the database providing at least one reference spectrum that has been stored in the database in a later performance of the method for an application, wherein the medium includes the component for which the respective stored reference spectrum has been determined.

In certain embodiments, the component spectra are only determined in spectral regions of interest with respect to the determination of the concentration the target component(s), and the spectral regions of interest include spectral regions, wherein the target component(s) exhibit distinct Raman bands.

The last mentioned embodiments include embodiments, wherein the identification and the elimination of the disturbing peaks is performed based on all possible pairs of Raman peaks determinable based on all Raman peaks included in the reference spectra that occur in the spectral regions of interest.

In certain embodiments, the component spectra are determined as baselined spectra by performing the method steps of for each reference spectrum determining a corresponding baselined reference spectrum by determining a baseline of the respective reference spectrum and by subtracting the baseline from the respective reference spectrum, and determining the component spectra based on baselined reference spectra. As an alternative, the component spectra are determined as baselined spectra by performing a method step of baselining each component spectrum by baselining each Raman peak remaining in the respective component spectrum after the elimination of the disturbing peaks, wherein baselining each remaining Raman peak includes determining a baseline or a linear baseline of the respective Raman peak and subsequently subtracting the spectral intensity values of the baseline from the corresponding spectral intensity values of the respective spectral intensity values of the respective Raman peak.

The present disclosure further includes a computer product comprising a non-transitory, computer readable medium storing instructions stored thereon that, when executed by at least one programmable processor, cause the at least one programmable processor to perform operations for performing a method of Raman spectroscopy comprising determining concentrations of at least one target component included in a medium in at least one application, wherein the medium includes a given combination of multiple components and each target component is included in the combination of the multiple components, based on reference spectra of each component provided to the at least one programmable processor, the operations comprising:

based on Raman peaks included in the reference spectra of all components, identifying Raman peaks that occur within less than a predetermined minimum spectral distance from each other as disturbing peaks;

for each component, based on the reference spectrum of the respective component, determining a component spectrum by eliminating each Raman peak included in the reference spectrum of the respective component that has been identified as a disturbing peak; and based on the component spectra, determining synthetic spectra of samples of the medium including different concentrations of each of the components.

In certain embodiments, the stored instructions of computer product further comprise instructions for performing operations comprising, based on the synthetic spectra, determining and providing a model for determining concentrations of each target component based on measured spectra of samples of the medium.

In a further aspect, the present disclosure further includes a Raman spectroscopic measurement system, comprising:

a Raman spectrometer, comprising: a monochromatic light source configured to transmit excitation light having a predetermined excitation wavelength a measurement region configured to accommodate a sample of a medium as to illuminate the sample; and a spectrometric unit configured to receive Raman scattered light emanating from the illuminated sample and to provide measured spectra, including intensity spectra of the Raman scattered light, wherein the spectrometric unit includes a disperser, a detector, and a signal processor configured to determine and to provide spectral intensity values of the measured spectra based on signals from the detector; and a signal processing unit configured to determine and provide a measurement result of a concentration of each target component included in the sample of the medium based on the measured spectra of the sample provided by the signal processor and on a previously determined model for determining the concentration based on spectral intensity values of the measured spectra, wherein the signal processor of the spectrometric unit and the signal processing unit are cooperatively configured to perform the method of the present disclosure.

BRIEF DESCRIPTION OF THE DRAWINGS

The described embodiments and other features, advantages and disclosures contained herein, and the manner of attaining them, will become apparent, and the present disclosure will be better understood by reference to the following description of various embodiments of the present disclosure taken in junction with the accompanying drawings, wherein.

DETAILED DESCRIPTION

Figure 1:
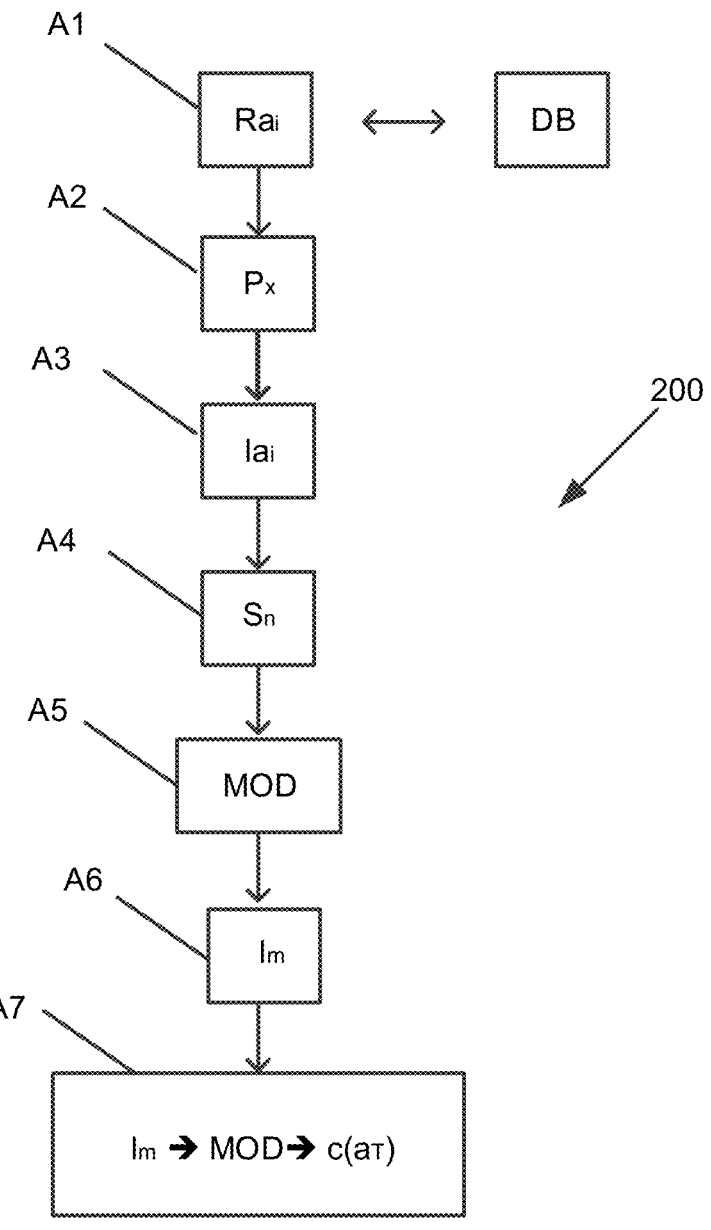
FIG. 1 shows a flow chart of a method of Raman spectroscopy according to the present disclosure.

The present disclosure includes a method 200 of Raman spectroscopy for measuring concentrations of at least one target component $a_T$ included in a medium in at least one application, wherein the medium includes a given combination of multiple components $a_i$ and each target component $a_T$ is one of the multiple components $a_i$. A flow chart of the method 200 is shown in FIG. 1.

The method 200 disclosed herein can be employed in any application in which a medium including the multiple components includes a given combination, e.g., a previously known or determinable combination, of at least two different components.

The applications, e.g., include applications in the petrochemical industry, in gas production, treatment and/or processing plants, in storage facilities, in supply units and/or in terminals, as nonlimiting examples. The applications, e.g., include hydrogen, methanol and/or ammonia production plants, steam methane reformers, partial oxidation reformers, coal gasifiers, petcoke gasifiers, biomass gasifiers, waste gasifiers, and/or liquid natural gas (LNG) production, processing, refrigeration and/or storage facilities, as nonlimiting examples.

The applications, e.g., include at least one application in which the medium is a gas. In these applications the components $a_i$, e.g., include hydrogen (H2), nitrogen (N2), oxygen (O2), carbon monoxide (CO), carbon dioxide (CO2), hydrogen sulfide (H2S), methane (CH4), ethylene (C2H4), ethane (C2H6), chlorine (Cl2), fluorine (F2), hydrogen fluoride (HF), boron trifluoride (BF3), sulfur dioxide (SO2), and/or at least one other component.

In addition or as an alternative the applications, e.g., include at least one application in which the medium is a liquid. In such applications, the components $a_i$, e.g., include components included in liquid natural gases (LNG), e.g., methane (CH4), ethane (C2H6), and/or at least one other component.

In each application, the method 200 includes a method step A1 of, for each component $a_i$ of the medium, providing a references spectrum $Ra_i$ of the respective component $a_i$.

Figure 2:
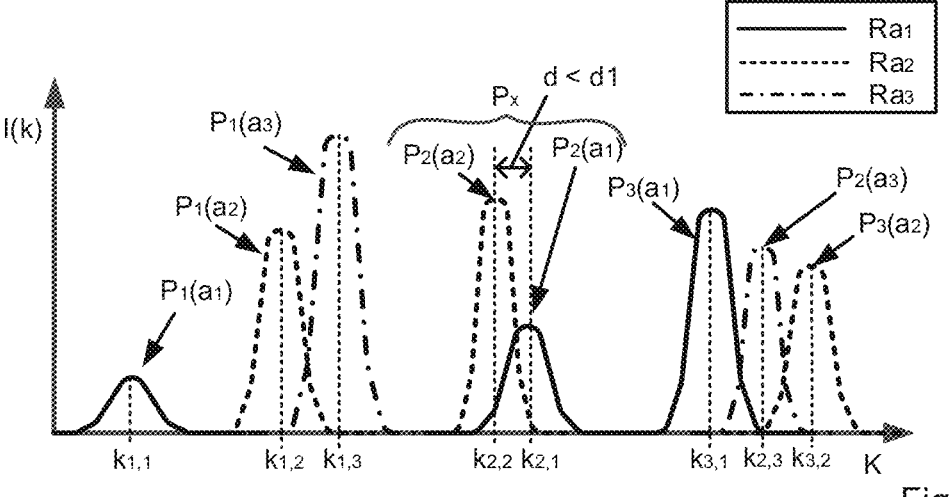
FIG. 2 shows extracts of reference spectra of three different components.

Exemplary simplified extracts of reference spectra $Ra_1$, $Ra_2$, $Ra_3$ of three different components $a_1$, $a_2$, $a_3$ are shown in FIG. 2. Each reference spectrum $Ra_1$, $Ra_2$, $Ra_3$ shown includes Raman peaks $P_1(a_1)$, $P_2(a_1)$, $P_3(a_1)$, $P_1(a_2)$, $P_2(a_2)$, $P_3(a_2)$, $P_1(a_3)$, $P_2(a_3)$ occurring in spectral ranges corresponding to the Raman bands exhibited by the respective component $a_1$, $a_2$, $a_3$.

In certain embodiments, for at least one or each component $a_i$, providing the reference spectrum $Ra_i$ of the component $a_i$, e.g., includes, with a Raman spectrometric instrument, determining and providing at least one intensity spectrum of a sample of the pure (e.g., lone) component $a_i$ and determining and providing the reference spectrum $Ra_i$ based on these intensity spectra. The determination of each intensity spectrum is, e.g., performed with a highly accurate Raman spectrometer and/or under laboratory conditions.

As indicated by the double pointed arrow shown in FIG. 1, in certain embodiments, the thus determined reference spectra $Ra_i$ are, e.g., stored in a database DB. In this case, the database DB, e.g., provides at least one of the stored reference spectra $Ra_i$ in a later performance of the method 200 in another application, in which other application the other medium also includes the component $a_i$, for which the respective reference spectrum $Ra_i$ has been determined. This provides the advantage that the reference spectrum $Ra_i$ of a specific component $a_i$ only has to be determined once and is then available in the database DB to be provided in method step A1 in each future applications, in which the future medium includes the respective component $a_i$.

The method 200 further includes a method step A2 of, based on Raman peaks $P_j(a_i)$ included in the reference spectra $Ra_i$ of all components $a_i$, identifying Raman peaks $P_j(a_i)$ that occur within less than a predetermined minimum spectral distance d1 from each other as disturbing peaks $P_x$.

In this respect, a spectral distance d between two Raman peaks $P_j(a_i)$ is, e.g., determined as a difference between the peak positions $k_{j,i}$ of the two Raman peaks $P_j(a_i)$. The peak position $k_{j,i}$ of each Raman peak $P_j(a_i)$ is, e.g., each determined as a spectral line, e.g., a Raman wavenumber shift, at which the respective Raman peak $P_j(a_i)$ exhibits its center or maximum.

The minimum spectral distance d1 is, e.g., predetermined such that Raman peaks $P_j(a_i)$ that are spaced apart by more than the minimum spectral distance d1 are identifiable as distinguishable peaks in a sum spectrum given by the sum of the intensity spectra of the two Raman peaks $P_j(a_i)$. In addition or as an alternative, the minimum spectral distance d1 is, e.g., predetermined such that Raman peaks $P_j(a_i)$ that are spaced apart by less than the minimum spectral distance d1 are indistinguishable in a sum spectrum given by the sum of the intensity spectra of the two Raman peaks $P_j(a_i)$.

The identification of disturbing peaks Px is illustrated in FIG. 2. In this example, the second Raman peak $P_2(a_1)$ included in the reference spectrum $Ra_1$ of the first component $a_1$ and the second Raman peak $P_2(a_2)$ included in the reference spectrum $Ra_2$ of the second component $a_2$ occur in almost entirely overlapping spectral regions, and their peak positions $k_{2,1}$ and $k_{2,2}$ are spaced apart by a spectral distance d given by $d := k_{2,1} - k_{2,2}$, which in the illustrated example is shorter than the minimum distance d1. Correspondingly, these two Raman peaks $P_2(a_1)$, $P_2(a_2)$ are both identified as disturbing peaks Px. All other Raman peaks $P_1(a_1)$, $P_1(a_2)$, $P_1(a_3)$, $P_3(a_1)$, $P_3(a_2)$, $P_2(a_3)$ shown in FIG. 2 are spaced apart from their nearest neighbor by more than the minimum distance d1 and are, therefore, considered (e.g., identified) as non-disturbing peaks.

The method further includes a method step A3 of determining a component spectrum $Ia_i$ for each component $a_i$ of the medium based on the reference spectrum $Ra_i$ of the respective component $a_i$ by eliminating each Raman peak $P_j(a_i)$ of the reference spectrum $Ra_i$ of the respective component $a_i$ that has been identified as a disturbing peak Px.

Figure 3:
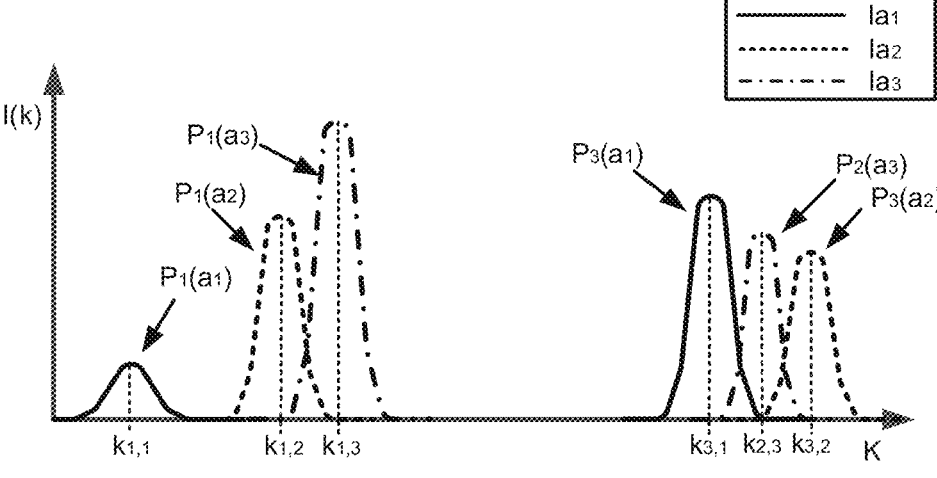
FIG. 3 shows component spectra determined by eliminating disturbing peaks included in the corresponding reference spectra shown in FIG. 2.

FIG. 3 shows examples of component spectra $Ia_1$, $Ia_2$, $Ia_1$ of the components $a_1$, $a_2$, $a_3$ that have each been determined based on the reference spectrum $Ra_1$, $Ra_2$, $Ra_3$ of the respective component $a_1$, $a_2$, $a_3$ shown in FIG. 2 by eliminating each disturbing peak Px included in the respective reference spectrum $Ra_1$, $Ra_2$, $Ra_3$.

With respect to the identification and the elimination of the disturbing peaks Px, different strategies may be pursued within the scope of method 200. In certain embodiments, the identification and the elimination is, e.g., performed by determining all possible pairs of Raman peaks $P_j(a_i)$ that are determinable based on the Raman peaks $P_j(a_i)$ included in all reference spectra $Ra_i$. Following this, the spectral distance between the two Raman peaks $P_j(a_i)$ of each pair is determined and both Raman peaks $P_j(a_i)$ of the respective pair are identified as disturbing peaks Px and subsequently eliminated in cases where the spectral distance between them is smaller than the minimum spectral distance d1. As an alternative, another method of determining and/or eliminating the disturbing peaks Px may be employed instead.

In certain embodiments, the reference spectra $Ra_1$, $Ra_2$, $Ra_3$ and/or the component spectra $Ia_1$, $Ia_2$, $Ia_3$ are, e.g., determined as full spectra each covering an entire predetermined spectral measurement range.

As an alternative, the determination of the component spectra $Ia_i$ may be limited to spectral regions of interest with respect to the determination of the concentration of each target component $a_T$. These spectral regions of interest are, e.g., given by spectral regions in which the target component(s) $a_T$ exhibit distinct Raman bands. In such embodiments, the component spectra $Ia_1$, $Ia_2$, $Ia_3$ are, e.g., only determined in the spectral regions of interest. In this case, the identification and the elimination of the disturbing peaks Px is, e.g., performed as described above based on all possible pairs of Raman peaks $P_j(a_i)$ determinable based on all Raman peaks $P_j(a_i)$ included in the reference spectra $Ra_i$ that occur in the spectral regions of interest.

Regardless of the method employed to determine and/or to eliminate the disturbing peaks Px, the elimination of the disturbing peaks Px provides the advantage of reducing the spectral overlap between Raman peaks $P_j(a_i)$ of the different component spectra $Ia_i$, as well as the correlation between the component spectra $Ia_i$.

In certain embodiments, the method step A3 of determining the component spectrum $Ia_i$ of each component $a_i$, e.g., includes eliminating each Raman peak $P_j(a_i)$ of the reference spectrum $Ra_i$ of the respective component $a_i$ that has been identified as a disturbing peak Px and subsequently limiting a spectral width of the remaining Raman peaks $P_j(a_i)$. This is illustrated in FIG. 4, which shows component spectra $Ia_1$, $Ia_2$, $Ia_1$, which have each been determined based on the reference spectrum $Ra_1$, $Ra_2$, $Ra_3$ of the respective component $a_1$, $a_2$, $a_3$ shown in FIG. 2 by eliminating each identified distributing peak Px from the respective reference spectrum $Ra_i$, $Ra_2$, $Ra_3$ and by subsequently limiting the spectral width of each remaining Raman peak $P_j(a_i)$.

Limiting the spectral width of the remaining Raman peaks $P_j(a_i)$ provides the advantage of further reducing the spectral overlap between the correspondingly reshaped Raman peaks $P'_j(a_i)$ included in the thus determined component spectra $Ia_i$, as well as the correlation between the component spectra $Ia_i$.

Limiting the spectral width of the remaining Raman peaks $P_j(a_i)$ can be performed in various ways. In certain embodiments, liming the spectral width of each remaining Raman peak $P_j(a_i)$ is, e.g., performed by truncating (e.g., cutting off) extended peak tails from both sides of the respective Raman peak $P_j(a_i)$.

Figure 4:
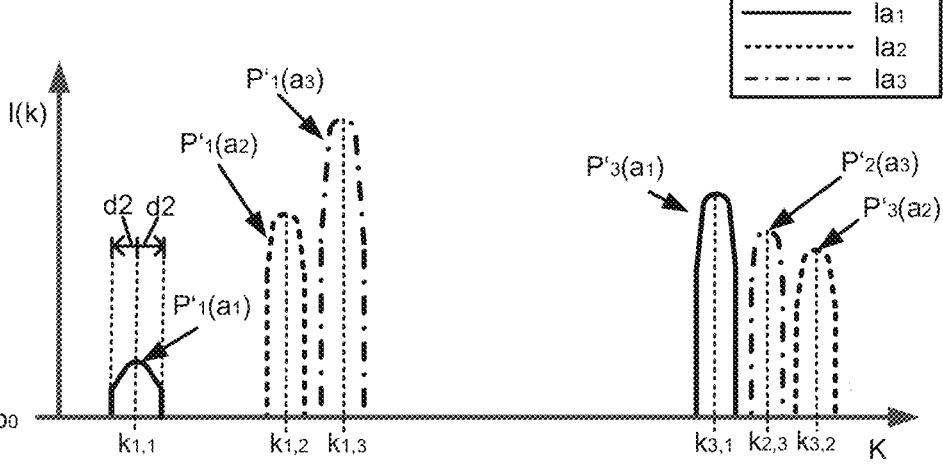
FIG. 4 shows component spectra determined based on the reference spectra shown in FIG. 2 by eliminating disturbing peaks and limiting a peak width of the remaining Raman peaks.

As illustrated in FIG. 4, based on the example of the first Raman peak $P'_1(a_1)$ of the component spectrum $Ia_1$ of the first component $a_1$, in certain embodiments, the limited spectral width of each Raman peak $P'_j(a_i)$ of the component spectra $Ia_i$ is, e.g., attained by setting a spectral intensity of the remaining Raman peaks $P_j(a_i)$ to a baseline value $b_0$, e.g., to zero, in spectral regions covered by the corresponding Raman peak $P_j(a_i)$ in the reference spectrum $Ra_i$ that are spaced apart from the peak position $k_{j,i}$ of the respective Raman peak $P_j(a_i)$ by more than a predetermined spectral distance d2.

As an alternative, in certain embodiments, the limited spectral width of each Raman peak $P'_j(a_i)$ of the component spectra $Ia_i$ is, e.g., attained by performing a width limitation method, e.g., a width limitation method accounting for a spectral shape exhibited by the respective Raman peak $P_j(a_i)$ in the reference spectrum $Ra_i$ of the respective component $a_i$.

In such embodiments, the spectral shape is, e.g., accounted for based on an intensity spectrum $I_{rp}(k)$ exhibited by the respective Raman peak $P_j(a_i)$ in the reference spectrum $Ra_i$ of the respective component $a_i$ and/or based on features exhibited by at least one derivative of the intensity spectrum $I_{rp}(k)$, e.g., a first derivative $DI_{rp}(k)$, a second derivative $SDI_{rp}(k)$ and/or a higher order derivative, at spectral lines on both sides of the peak position kp of the respective Raman peak $P_j(a_i)$ in the reference spectrum $Ra_i$.

Figures 5, 6, 7, 8, 9:
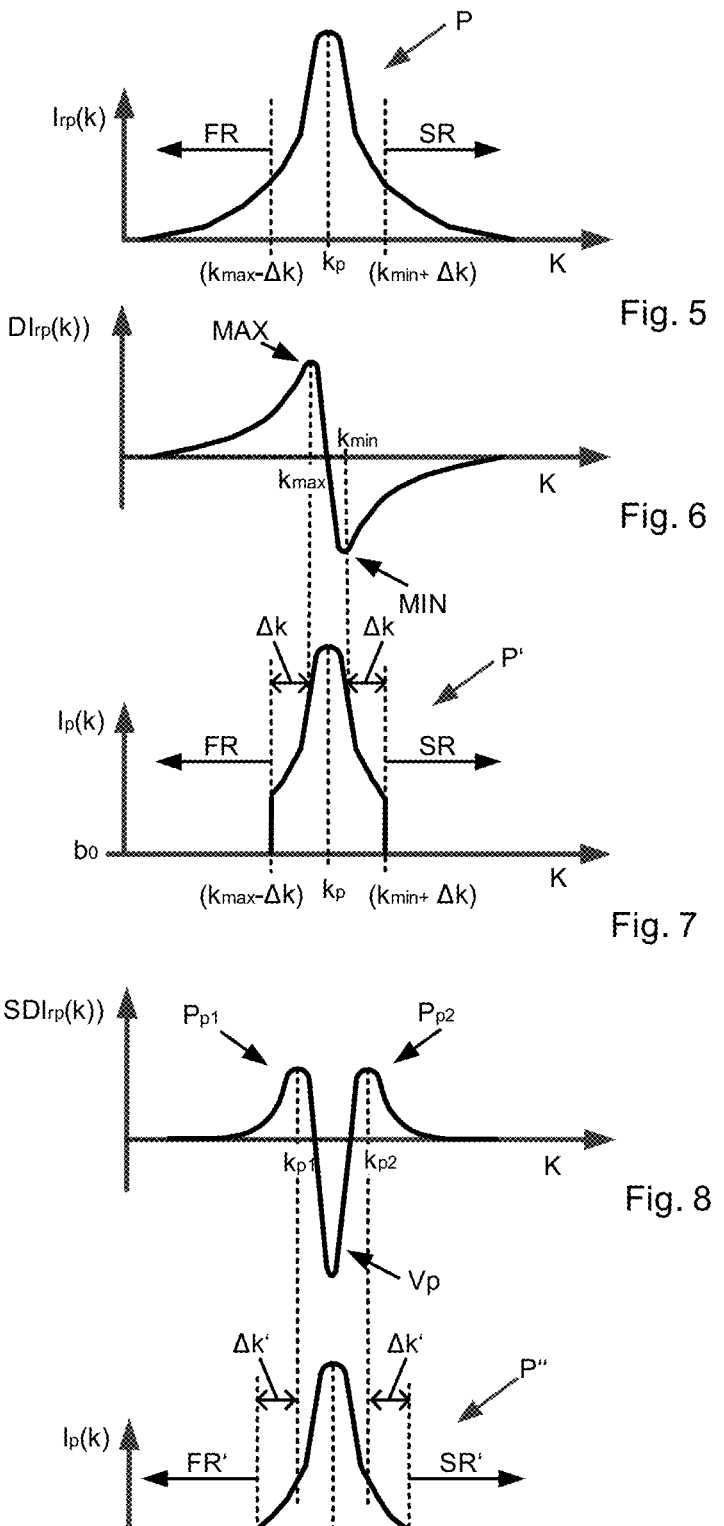
FIG. 5 shows an intensity spectrum of a Raman peak.
FIG. 6 shows a first derivative of the intensity spectrum shown in FIG. 4.
FIG. 7 shows an intensity spectrum of a Raman peak determined by limiting a peak width of the Raman peak shown in FIG. 5 based on the first derivative shown in FIG. 6.
FIG. 8 shows a second derivative of the intensity spectrum shown in FIG. 4.
FIG. 9 shows an intensity spectrum of a Raman peak determined by limiting a peak width of the Raman peak shown in FIG. 5 based on the second derivative shown in FIG. 7.

In certain embodiments, the width limitation method includes a first method step of determining the first derivative $DI_{rp}(k)$ of the intensity spectrum $I_{rp}(k)$ exhibited by the respective Raman peak $P_j(a_i)$ in the reference spectrum $Ra_i$ of the respective component $a_i$. This step is illustrated in FIG. 5, showing the intensity spectrum $I_{rp}(k)$ of an exemplary Raman peak P included in a reference spectrum $Ra_i$, and in FIG. 6, showing the first derivative $DI_{rp}(k)$ of the intensity spectrum $I_{rp}(k)$ shown in FIG. 5. As is apparent from FIGS. 5 and 6, the peaked shape inherent to Raman peaks causes the first derivative $DI_{rp}(k)$ to exhibit a maximum MAX at a spectral line $k_{max}$ below the peak position $k_p$ of the Raman peak P and a minimum MIN at a spectral line $k_{min}$ above the peak position $k_p$.

In such embodiments, the width limitation method further includes a method step of setting spectral intensity values of the respective Raman peak $P_j(a_i)$ to a baseline value $b_0$, e.g., to zero, in a first spectral region FR covered by the respective Raman peak $P_j(a_i)$ in the reference spectrum $Ra_i$, including spectral lines k less than the spectral line $k_{max}$ at which the first derivative $DI_{rp}(k)$ exhibits the maximum MAX by more than a predetermined spectral distance $\Delta k$, and includes a method step of setting spectral intensity values of the respective Raman peak $P_j(a_i)$ to the baseline value $b_0$ in a second spectral region SR covered by the respective Raman peak $P_j(a_i)$ in the reference spectrum $Ra_i$, including spectral lines k greater than the spectral line $k_{min}$ at which the first derivative $DI_{rp}(k)$ exhibits the minimum MIN by more than the predetermined spectral distance $\Delta k$.

This operation is illustrated in FIG. 7, showing an intensity spectrum $I_{rp}(k)$ of the resulting Raman peak P' exhibiting the limited spectral width attained by setting the spectral intensity values of the Raman peak P shown in FIG. 5 to the baseline value $b_0$ in the first spectral region FR, e.g., by $I_p(k)=b_0$ for $k<(k_{max}-\Delta k)$, and in the second spectral region SR, e.g., by $I_{rp}(k)=b_0$ for $k>(k_{min}+\Delta k)$.

As an alternative, in certain embodiments, the width limitation method includes a first method step of determining a second derivative $SDI_{rp}(k)$ of the intensity spectrum $I_{rp}(k)$ exhibited by the respective Raman peak $P_j(a_i)$ in the reference spectrum $Ra_i$ of the respective component $a_i$. This step is illustrated in FIG. 8, showing the second derivative $SDI_{rp}(k)$ of the intensity spectrum $I_{rp}(k)$ shown in FIG. 5. As is apparent from FIGS. 5 and 8, the peaked shape inherent to the Raman peak P causes the second derivative $SDI_{rp}(k)$ to exhibit two peaks Pp1, Pp2 and a valley Vp located between the two peaks Pp1, Pp2.

In such embodiments, the width limitation method, e.g., further includes a method step of determining the peak positions kp1, kp2 of the two peaks Pp1, Pp2. Each peak position kp1, kp2 is, e.g., determined to be given by the spectral line at which the respective peak Pp1, Pp2 exhibits its center or maximum. Following this, the spectral intensity values of the respective Raman peak $P_j(a_i)$ are set to a baseline value $b_0$, e.g., to zero, in a first spectral region FR' covered by the respective Raman peak $P_j(a_i)$ in the reference spectrum $Ra_i$, including spectral lines k less than the smaller one of the two peak positions kp1 by more than a predetermined spectral distance $\Delta k'$, and a includes method step of setting spectral intensity values of the respective Raman peak $P_j(a_i)$ to the baseline value $b_0$ in a second spectral region SR' covered by the respective Raman peak $P_j(a_i)$ in the reference spectrum $Ra_i$, including spectral lines k greater than the larger one of the two peak positions kp2 by more than the predetermined spectral distance $\Delta k'$.

This operation is illustrated in FIG. 9, showing an intensity spectrum $I_{rp}(k)$ of the resulting Raman peak P''' exhibiting the limited spectral width attained by setting the spectral intensity values of the Raman peak P shown in FIG. 5 to the baseline value $b_0$ in the first spectral region FR', e.g., by $I_p(k)=b_0$ for $k<(k_{p1}-\Delta k')$, and in the second spectral region SR', e.g., by $I_p(k)=b_0$ for $k>(k_{p2}+\Delta k')$.

As an alternative, another method of limiting the spectral width of the Raman peaks $P_j(a_i)$ remaining in the component spectra $Ia_i$ after the elimination of the disturbing peaks Px may be employed. As an example, in certain embodiments, the spectral regions in which the spectral intensity values of the respective Raman peak $P_j(a_i)$ are set to a baseline value $b_0$, e.g., to zero, are, e.g., determined based on a combination, e.g., an average or a weighted sum, of the spectral line $k_{min}$ at which the first derivative $DI_{rp}(k)$ exhibits the maximum MAX and the smaller one of the peak positions kp1 of the peaks Pp1, Pp2 of the second derivative $SDI_{rp}(k)$, and on a combination, e.g., an average or a weighted sum, of the spectral line $k_{max}$ at which the first derivative $DI_{rp}(k)$ exhibits the minimum MIN and the larger one of the peak positions kp2 of the peaks Pp1, Pp2 of the second derivative $SDI_{rp}(k)$.

In certain embodiments, the component spectra $Ia_i$ is, e.g., determined as baselined component spectra. Baselining the component spectra $Ia_i$ can be performed in various ways.

As an example, in certain embodiments baselining the component spectra $Ia_i$, e.g., includes for each reference spectrum $Ra_i$ determining a baseline of the respective reference spectrum $Ra_i$ and determining the component spectra $Ia_i$ as describe above based on the baselined reference spectra. In such an embodiment, the baselined reference spectra are, e.g., each determined by subtracting the baseline of the respective reference spectrum $Ra_i$ from the reference spectrum $Ra_i$. With respect to the determination of the baselines of the respective reference spectra $Ra_i$, methods known in the art for baselining spectra may be employed.

As an alternative, baselining the component spectra $Ia_i$ is, e.g., performed by baselining each Raman peak $P_j(a_i)$ remaining in the component spectra $Ia_i$ after the elimination of the disturbing peaks Px. For each remaining Raman peak $P_j(a_i)$, this operation is, e.g., performed by determining a baseline of the respective Raman peak $P_j(a_i)$ and by subsequently subtracting the spectral intensity values of the baseline from the corresponding spectral intensity values of the respective spectral intensity values of the respective Raman peak $P_j(a_i)$. In embodiments which include limiting the spectral width of the remaining Raman peaks $P_j(a_i)$, the baselining is, e.g., performed after limiting the spectral width.

Figure 10:
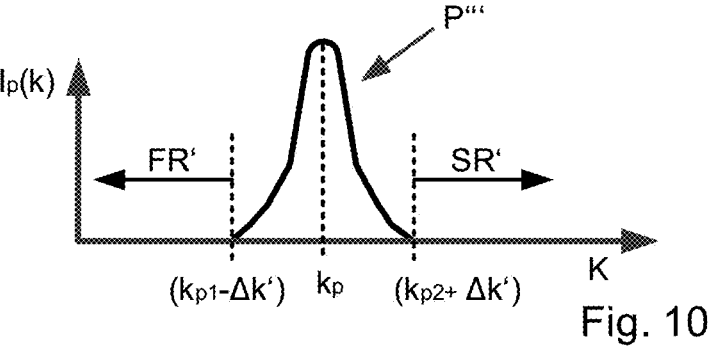
FIG. 10 shows an intensity spectrum of a Raman peak determined by baselining the Raman peak shown in FIG. 9.

An example of baselining the remaining Raman peaks $P_j(a_i)$ is illustrated in FIGS. 9 and 10. FIG. 9 shows an exemplary baseline $b(\lambda)$ of the Raman peak P shown in FIG. 5, and FIG. 10 shows the baselined Raman peak P''' determined by subtracting this baseline $b(\lambda)$. The baseline $b(\lambda)$ is, e.g., determined as a linear baseline given by a straight line crossing the spectral intensity profile of the Raman peak P on both sides of the peak position $k_p$ of the Raman peak P in a base area of the Raman peak P. As shown in FIGS. 9 and 10, in combination with the limitation of the spectral width of the remaining Raman peaks $P_j(a_i)$, the baseline $b(\lambda)$ of each remaining Raman peaks $P_j(a_i)$ is, e.g., determined as a line, e.g., a straight line, connecting both outside ends of the spectral intensity profile of the width limited remaining Raman peak $P_j(a_i)$.

Following the determination of the component spectra $Ia_i$, the method 200 further includes a method step A4 of, based on the component spectra $Ia_i$, determining synthetic spectra $S_n$ of samples n of the medium including different concentrations $w_{n,i}$ of each of the components $a_i$. The method 200 further includes a method step A5 of, based on the synthetic spectra $S_n$, determining and providing a model MOD for determining concentrations $c(a_T)$ of each target component $a_T$ included in the medium based on measured spectra $I_m$ of samples SM of the medium.

In method step A4, each synthetic spectrum $S_n$ is, e.g., determined as a weighted sum of the component spectra $Ia_i$, e.g., by $S_n := \Sigma_i w_{n,i} * Ia_i$, in which each weighing factor corresponds to the concentration $w_{n,i}$ of the respective component $a_i$ included in the sample n.

The synthetic spectra $S_n$ provides the advantage that the component spectra $Ia_i$ only need to be provided once and that, subsequently, very little computing power is required to determine large numbers of synthetic spectra $S_n$ of samples n covering broad ranges, e.g., ranges of 0% to 100%, of concentrations $w_{n,i}$ of each component $a_i$.

In method step A5, the determination of the model is, e.g., performed by analyzing training data including the synthetic spectra $S_n$ of the samples n and the corresponding values of the concentrations $w_{n,i}$ of the components $a_i$ included in each sample n and by, based on the analysis, determining and providing an algorithm for calculating concentrations $c(a_T)$ of each target component $a_T$ included in samples SM of the medium based on spectral intensity values of measured spectra $I_m$ of samples SM of the medium.

With respect to the analysis of the training data and/or the determination of the algorithm, methods currently employed to determine models based on experimentally determined reference sample spectra can, e.g., be used. As an example, in certain embodiments, determining the model MOD, e.g., includes performing a multivariate analysis of the training data.

In addition or as an alternative, in certain embodiments, determining the model MOD, e.g., includes, based on the training data, performing a method step of quantitatively assessing interdependencies between spectral intensities of the synthetic spectra $S_n$ and the concentrations $w_{n,i}$ of the individual components $a_i$ included in the samples n. In such embodiments, the model MOD is e.g., determined based on the quantitatively assessed interdependencies.

In such embodiments, the reduced spectral overlap between the Raman peaks $P_j(a_i)$ or $P'_j(a_i)$ of the different component spectra $Ia_i$, as well as the reduced correlation between the component spectra $Ia_i$ employed to determine the synthetic spectra $S_n$, facilitate the identification of the interdependencies and increase the accuracy of the quantitative assessment thereof. These effects in turn increase the measurement accuracy of concentration measurements performed with the thus determined model MOD.

In addition or as an alternative, in certain embodiments, determining the model MOD, e.g., includes determining spectral lines at which the spectral intensities of the synthetic spectra $S_n$ reliably provide information that enables for the concentrations $c(a_T)$ of the target component(s) $a_T$ to be accurately determined. In such embodiments, the model MOD is, e.g., determined such that it is configured to determine the concentrations $c(a_T)$ of the target component(s) $a_T$ included in samples SM of the medium based on spectral intensity values of measured spectra $I_m$ of samples SM of the medium at selected spectral lines corresponding to spectral lines at which the spectral intensities of the synthetic spectra $S_n$ reliably provide information that enables for the concentrations $c(a_T)$ of individual target components $a_T$ to be accurately determined. With respect to this model determination, the reduced spectral overlap between the Raman peaks $P_j(a_i)$ or $P'_j(a_i)$ of the different component spectra $Ia_i$, as well as the reduced correlation between the component spectra $Ia_i$ employed to determine the synthetic spectra $S_n$, facilitate the selection of the spectral lines at which the spectral intensities of the synthetic spectra S, and correspondingly also the measured spectra $I_m$, reliably provide information that enables for the concentrations $c(a_T)$ of the target component(s) $a_T$ to be accurately determined. At the same time, interdependencies between the spectral intensities of synthetic spectra $S_n$ and the measured spectra $I_m$ at the selected spectral lines and the concentrations $c(a_i)$ of all other components $a_i$ can be much more easily quantitatively assessed and accounted for in the model MOD.

Thus, determining the model MOD based on the synthetic spectra $S_n$ and the corresponding concentrations $w_{n,i}$ of the components $a_i$ significantly reduces the time and effort involved in determining the model MOD. At the same time, it increases the measurement accuracy of concentration measurements achievable with the thus determined model MOD.

In certain embodiments, the method 200 further includes a method step A6 of, with a Raman spectrometer 110, determining measured spectra $I_m$ of samples SM of the medium. The method 200 further includes a method step A7 of, based on the measured spectra $I_m$ and the previously determined model MOD, determining and providing measurement results of the concentrations $c(a_T)$ of each target component $a_T$ included in the samples SM.

Figure 11:
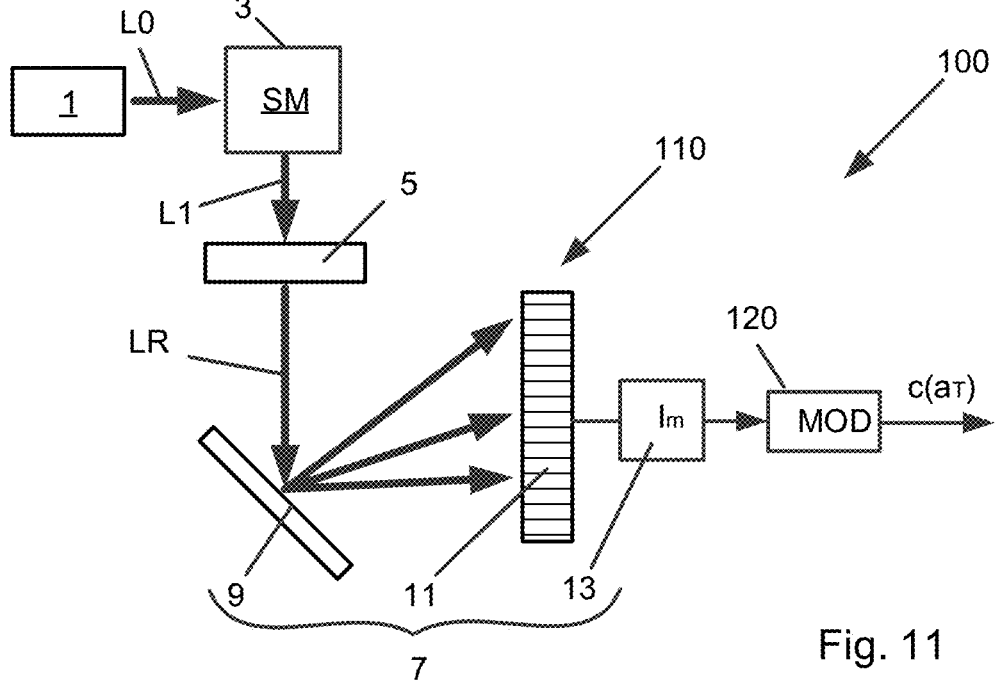
FIG. 11 shows a Raman spectrometric measurement system according to the present disclosure.

In another aspect of the present disclosure, at least portions of the method 200 may be performed by a Raman spectroscopic measurement system 100, including a Raman spectrometer 110 configured to determine and provide measured spectra $I_m$ of samples SM of the medium including the given (e.g., known) combination of components $a_i$ for which the model MOD has been determined, as shown in FIG. 11.

The exemplary Raman spectrometer 110 of FIG. 11 includes a monochromatic light source 1, e.g., a laser, configured to transmit excitation light L0 having a predetermined excitation wavelength $\lambda_0$ to a measurement region 3 configured to accommodate the respective sample SM of the medium.

In certain embodiments, the excitation wavelength 2 is, e.g., a wavelength in the visual or near infrared wavelengths range, e.g., a wavelength of 785 nm or of 532 nm. In addition or as an alternative, in certain embodiments, the Raman spectrometer 110, e.g., includes a filter 5, e.g., a notch-filter, configured to filter out measurement light LR, e.g., Raman scattered light, included in light L1 emanating from the illuminated sample SM.

The Raman spectrometer 110 further includes a spectrometric unit 7 configured to receive the measurement light LR and determining and providing the measured spectra $I_m$ as intensity spectra of the received measurement light LR.

In certain embodiments, the spectrometric unit 7, e.g., includes a disperser 9, e.g., a diffractive or holographic grating, configured to disperse the incident measurement light LR as to separate the measurement light LR by wavelength, a detector 11 configured to receive the dispersed measurement light LR, and a signal processor 13, e.g., a microprocessor, connected to the detector 11. The detector 11 is configured to determine and to provide detector signals corresponding to spectral intensities of the incident dispersed measurement light LR. The signal processor 13 is configured to determine and to provide intensity values of the measured spectra $I_m$ based on the detector signals.

As shown in FIG. 11, the Raman spectroscopic measurement system 100, e.g., includes a signal processing unit 120, e.g., a computer, a microprocessor or another type of calculating unit, configured to determine and provide measurement results of the concentrations $c(a_T)$ of each target component $a_T$ included in the samples SM of the medium based on the measured spectra $I_m$ of the samples SM provided by the signal processor 13 and the previously determined model MOD for determining these concentrations $c(a_T)$ based on spectral intensity values of the measured spectra $I_m$.

The method 200 may be, e.g., performed as a computer implemented method. In this aspect, the present disclosure further includes a computer product comprising a non-transitory, computer readable medium storing instructions for performing at least some or all the steps of the method 200 disclosed herein, e.g., computer code for performing the method steps A2 to A4 of, based on the reference spectra $Ra_i$, determining and providing the synthetic spectra $S_n$. In certain embodiments, the computer product, e.g., further comprises instructions for performing at least one further method step of the method 200, e.g., instructions for performing the method step A5 of, based on the synthetic spectra $S_n$, determining and providing the model MOD. The computer product provides the advantage of enabling the corresponding method steps to be performed in an automated manner. In at least one embodiment, the computer product is configured to perform the method 200 using the Raman spectroscopic measurement system 100 as described herein.

We claim:

1. A Raman spectroscopic measurement method of determining a concentration of at least one target component included in a medium in at least one application, wherein the medium includes a given combination of multiple components, wherein each target component is one of the multiple components, the method comprising:

with a Raman spectrometer, determining measured spectra of samples of the medium;

for each component of the medium, providing a reference spectrum of the component;

based on Raman peaks included in the reference spectra of all components, identifying Raman peaks that occur within less than a predetermined minimum spectral distance from each other as disturbing peaks;

for each component, based on the reference spectrum of the respective component, determining a component spectrum by eliminating each Raman peak included in the reference spectrum of the respective component identified as a disturbing peak;

based on the component spectra, determining synthetic spectra of samples of the medium including different concentrations of each of the components;

based on the synthetic spectra, determining and providing a model for determining concentrations of each target component based on measured spectra of samples of the medium; and based on the measured spectra and the determined model, determining and providing measurement results of the concentrations of each target component included in the samples of the medium.

2. The method according to claim 1, wherein the minimum spectral distance is predetermined such that:

Raman peaks that are spaced apart by more than the minimum spectral distance are identifiable as distinguishable peaks in a sum spectrum given by the sum of the intensity spectra of the respective Raman peaks; and/or Raman peaks that are spaced apart by less than the minimum spectral distance are indistinguishable in a sum spectrum given by the sum of the intensity spectra of the respective Raman peaks.

3. The method according to claim 1, wherein identifying the disturbing peaks comprises:

determining all possible pairs of Raman peaks determinable based on the Raman peaks included in all reference spectra; and for each pair, determining a spectral distance between the Raman peaks of the respective pair and identifying both peaks of the respective pair as disturbing peaks when the spectral distance between them is smaller than the minimum spectral distance.

4. The method according to claim 1, wherein for each component, the determining of the component spectrum of the respective component further comprises at least one of:

limiting a spectral width of each Raman peak remaining in the component spectrum after the eliminating of the disturbing peak(s); and truncating peak tails from both sides of each Raman peak remaining in the component spectrum after the eliminating of the disturbing peak(s).

5. The method according to claim 1, wherein for each component, the determining of the component spectrum of the respective component further includes setting a spectral intensity of each Raman peak remaining in the respective component spectrum to a baseline value or to a value of zero in spectral regions covered by the corresponding Raman peak in the reference spectrum that are spaced apart from a peak position of the respective Raman peak at which the Raman peak exhibits its center or maximum by more than a predetermined spectral distance.

6. The method according to claim 1, wherein for each component, the determining of the component spectrum of the respective component further comprises limiting a spectral width of each Raman peak remaining in the component spectrum after the eliminating of the disturbing peak(s), wherein limiting the spectral width is performed:

a) by performing a width limitation method accounting for a spectral shape exhibited by the respective Raman peak in the reference spectrum of the respective component;

b) based on an intensity spectrum exhibited by the respective Raman peak in the reference spectrum of the respective component;

c) based on a first derivative, a second derivative, and/or a higher order derivative of an intensity spectrum exhibited by the respective Raman peak in the reference spectrum of the respective component; and/or d) based on features exhibited by a first derivative, a second derivative, and/or a higher order derivative of the intensity spectrum exhibited by the respective Raman peak in the reference spectrum of the respective component at spectral lines on both sides of a peak position of the respective Raman peak in the reference spectrum.

7. The method according to claim 1, wherein for each component, the determining of the component spectrum of the respective component further comprises, for each Raman peak remaining in the component spectrum:

determining a first derivative of an intensity spectrum exhibited by the corresponding Raman peak in the reference spectrum of the respective component;

setting a spectral intensity of the respective remaining Raman peak to a baseline value or to a value of zero in a first spectral region covered by the corresponding Raman peak in the reference spectrum, wherein the first spectral region includes spectral lines less than a spectral line at which the first derivative exhibits a maximum by more than a predetermined spectral distance; and setting a spectral intensity of the respective remaining Raman peak to a baseline value or to a value of zero in a second spectral region covered by the corresponding Raman peak in the reference spectrum, wherein the second spectral region includes spectral lines greater than a spectral line at which the first derivative exhibits a minimum by more than the predetermined spectral distance.

8. The method according to claim 1, wherein for each component, the determining of the component spectrum of the respective component further comprises, for each Raman peak remaining in the component spectrum:

determining a second derivative of an intensity spectrum exhibited by the respective Raman peak in the reference spectrum of the respective component;

based on the second derivative exhibiting two peaks and a valley located between the two peaks, determining a peak position of each peak;

setting a spectral intensity of the respective remaining Raman peak to a baseline value or to a value of zero in a first spectral region covered by the corresponding Raman peak in the reference spectrum, wherein the first spectral region includes spectral lines less than the smaller of the peak positions of the two peaks by more than a predetermined spectral distance; and setting a spectral intensity of the respective remaining Raman peak to a baseline value or to a value of zero in a second spectral region covered by the corresponding Raman peak in the reference spectrum, wherein the second spectral region includes spectral lines greater than the larger of the peak positions of the two peaks by more than the predetermined spectral distance.

9. The method according to claim 1, wherein each synthetic spectrum is determined as a weighted sum of the component spectra of each of the components included in the medium, wherein each weighing factor corresponds to the concentration of the respective component included in the sample.

10. The method according to claim 1, wherein the determining of the model comprises, based on training data including the synthetic spectra of the samples and the concentrations of the components included in each sample, at least one of:

based on an analysis or a multivariate analysis of the training data, determining and providing an algorithm for calculating concentrations of each target component included in samples of the medium based on spectral intensity values of measured spectra of the samples of the medium;

quantitatively assessing interdependencies between spectral intensities of the synthetic spectra and the concentrations of the individual components and determining the model based on the quantitatively assessed interdependencies; and determining spectral lines, at which the spectral intensities of the synthetic spectra provide information enabling for the concentrations of each target component to be determined, and determining the model so as to determine concentrations of each target component included in samples of the medium based on spectral intensity values of measured spectra of samples of the medium at selected spectral lines corresponding to spectral lines at which the spectral intensities of the synthetic spectra provide information enabling for the concentrations of each target component to be determined.

11. The method according to claim 1, wherein for at least one or each component providing the reference spectrum of the respective component includes:

with a Raman spectrometric instrument, determining and providing at least one intensity spectrum of a sample of a pure component; and determining and providing the respective reference spectrum based on the at least one intensity spectrum.

12. The method according to claim 1, further comprising:

storing at least one or each reference spectrum that has been determined for one of the components in a database; and with the database, providing at least one reference spectrum stored in the database in a later performance of the method for a later application, wherein the medium includes the component for which the respective stored reference spectrum has been determined.

13. The method according to claim 1, wherein the component spectra are determined only in spectral regions of interest with respect to the determination of the concentration of each target component respectively, and wherein the spectral regions of interest include spectral regions in which each respective target component exhibits distinct Raman bands.

14. The method according to claim 13, wherein the identifying and the eliminating of the disturbing peaks is performed based on all possible pairs of Raman peaks determinable based on all Raman peaks included in the reference spectra that occur in the spectral regions of interest.

15. The method according to claim 1, wherein the component spectra are determined as baselined spectra by:

for each reference spectrum, determining a corresponding baselined reference spectrum by determining a baseline of the respective reference spectrum and by subtracting the baseline from the respective reference spectrum, and determining the component spectra based on baselined reference spectra; or baselining each component spectrum by baselining each Raman peak remaining in the respective component spectrum after the eliminating the disturbing peaks, wherein baselining each remaining Raman peak includes determining a baseline or a linear baseline of the respective Raman peak and subsequently subtracting the spectral intensity values of the baseline from the corresponding spectral intensity values of the respective spectral intensity values of the respective Raman peak.

16. A Raman spectroscopic measurement system, comprising:

a Raman spectrometer, comprising:

a monochromatic light source configured to transmit excitation light having a predetermined excitation wavelength to a measurement region configured to accommodate a sample of a medium as to illuminate the sample; and a spectrometric unit configured to receive Raman scattered light emanating from the illuminated sample and to provide measured spectra, including intensity spectra of the Raman scattered light, wherein the spectrometric unit includes a disperser, a detector, and a signal processor configured to determine and to provide spectral intensity values of the measured spectra based on signals from the detector; and a signal processing unit configured to determine and provide a measurement result of a concentration of each target component included in the sample of the medium based on the measured spectra of the sample provided by the signal processor and on a previously determined model for determining the concentration based on spectral intensity values of the measured spectra, wherein the signal processor of the spectrometric unit and the signal processing unit are cooperatively configured to perform the Raman spectroscopic measurements of the concentrations of the target compounds according to claim 1.

17. A computer product comprising a non-transitory, computer readable medium storing instructions stored thereon that, when executed by at least one programmable processor, cause the at least one programmable processor to perform operations for performing a Raman spectroscopic measurement method comprising determining concentrations of at least one target component included in a medium in at least one application, wherein the medium includes a given combination of multiple components and each target component is included in the combination of the multiple components, based on reference spectra of each component and measured spectra of samples of the medium provided to the at least one programmable processor, the operations comprising:

based on Raman peaks included in the reference spectra of all components, identifying Raman peaks that occur within less than a predetermined minimum spectral distance from each other as disturbing peaks;

for each component, based on the reference spectrum of the respective component, determining a component spectrum by eliminating each Raman peak included in the reference spectrum of the respective component that has been identified as a disturbing peak;

based on the component spectra, determining synthetic spectra of samples of the medium including different concentrations of each of the components;

based on the synthetic spectra, determining and providing a model for determining concentrations of each target component based on measured spectra of samples of the medium; and based on the measured spectra and the determined model, determining and providing measurement results of the concentrations of each target component included in the samples of the medium.

\* \* \* \* \*